Nov. 14, 1950  A. P. BRIETZKE  2,529,833
INDICATOR MECHANISM
Filed Aug. 27, 1946

INVENTOR
ADRIAN P. BRIETZKE

Bair + Freeman

ATTORNEYS

Patented Nov. 14, 1950

2,529,833

UNITED STATES PATENT OFFICE 2,529,833

INDICATOR MECHANISM

Adrian Paul Brietzke, La Crosse, Wis., assignor to Northern Engraving & Manufacturing Co., La Crosse, Wis., a corporation of Wisconsin Application August 27, 1946, Serial No. 693,312

1 Claim. (Cl. 116—135)

This invention relates to indicator mechanisms wherein straight-line motion of an indicator element is produced by rotary motion.

An object of the invention is the provision of an indicator mechanism which is simple and rugged.

Another object is the provision of an indicator mechanism, in which the moving parts are simple and easily assembled.

A further object of the invention is the provision, in one form thereof, of an indicator element which will sustain its own weight when extended from the actuating mechanism.

A further object is the provision of an indicator mechanism in which the parts making up the device are simple, standard elements.

With these and other objects in view, my invention consists in the construction, arrangement and combination of the various parts of my device whereby the objects contemplated are attained, as hereinafter more fully set forth, pointed out in the claim and illustrated in the accompanying drawings, in which:

Figure 2:
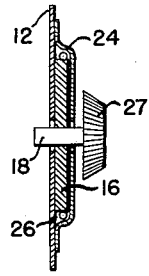
Fig. 2 is a sectional view taken on line 2—2 of Fig. 1.
Figure 1:
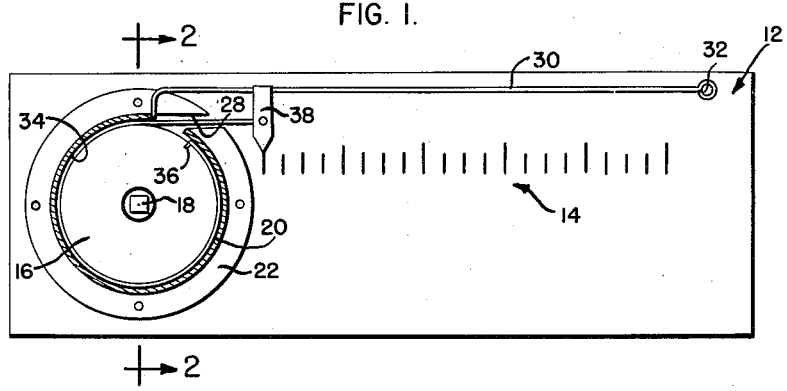
Fig. 1 is a front view of one form of indicator mechanism.

Referring in detail to the drawings, the device as shown in Figs. 1 and 2 employs a supporting member 12 which may be of any material such as metal or plastic. A dial or scale 14 is formed on the supporting member 12 in horizontal position and positioned toward one end thereof.

A disc 16 is fitted on a squared shaft 18 which is rotatably mounted in the suporting member 12, adjacent one end of the dial or scale 14. Disposed over the disc 16 is a shield or enclosing member 20 having a marginal flange 22 for securing to the surface of the supporting member 12. The shield 20 is provided with a central opening for accommodating the shaft 18 and is of appropriate diameter to extend outwardly beyond the perimeter of the disc 16, as indicated at 24, leaving a space 26 between itself and the margin of the disc 16. An operating knob 27 is secured to the shaft 18 outwardly of the shield 20.

An opening 28 is formed in the shield 20 substantially tangential to the disc 16 and opens in a direction along a line parallel with the scale 14 and slightly above it.

A wire guide 30 is secured at one end to the shield 20 or to the supporting member adjacent the shield; its other end formed with an eyelet, where it is secured to the supporting member 12. The wire guide 30 is slightly spaced from the plane of the supporting member, and is disposed above the opening 28 and lies on a line parallel with the scale 14.

An indicator element 34, which may be of ordinary flexible wire, is positioned in the space 26, and has its inner end secured to the disc 16, as shown at 36. The outer end of the indicator element 34 extends out of the opening 28 and is provided on its outer end with a pointer 38 having an opening therein fitted on the guide 30 and slidable therealong.

On rotation of the disc 16, the indicator element 34 may be extended and retracted for sliding the pointer 38 along the guide 30 and thus moving it along the scale 14.

Figure 4:
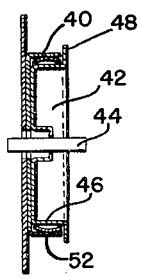
Fig. 4 is a sectional view taken on line 4—4 of Fig. 3.
Figure 3:
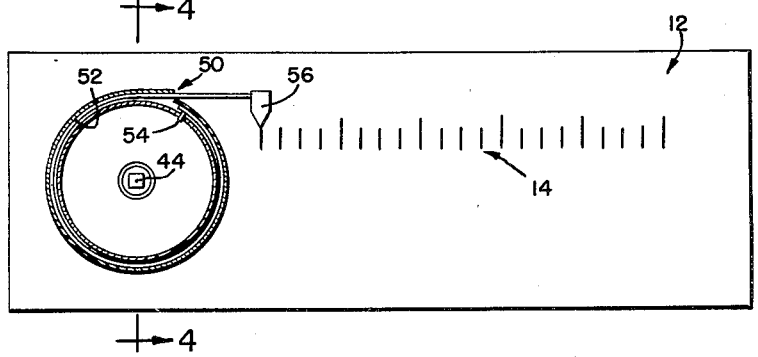
Fig. 3 is a front view of a modified form of the invention.
Figure 5:
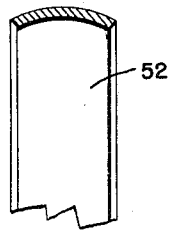
Fig. 5 is an enlarged detailed view, partially in section, of the indicator element employed in Figures 3 and 4.

The modified form shown in Figs. 3, 4, and 5 includes a supporting member 12, and a dial or scale 14, formed thereon, similarly as in the first embodiment. A cup-shaped element 40, having a central opening is secured to the supporting member 12 adjacent one end of the dial, and is positioned with its open side facing outwardly. Fitted in the cup-shaped element 40 is a second cup-shaped element 42 also having its open side facing outwardly. The cup-shaped element 42 is secured to a squared shaft 44 extending through the central opening in the element 40 and rotatably mounted in the supporting member 12. The element 42 is of lesser diameter than the element 40, leaving a space 46 therebetween and is provided with a radial flange 48 extending over the space 46.

The element 40 is provided with a tangential opening 50 extending on a line parallel with and adjacent the dial 14.

An indicator element 52 is fitted in the space 46 between the two cup-shaped elements with its inner end secured to the rotatable cup-shaped element 42, as indicated at 54. The opposite end of the indicator element 52 extends out of the opening 50 and has a pointer 56 secured to its outer end.

By rotating the rotatable element 42, the indicator element 52 can be extended and retracted through the opening 50, thereby moving the pointer 56 along the scale 14.

Reference to Fig. 5 will show that the indicator element 52 is generally ribbon-shaped and of arcuate cross-section. When it is extended out of the opening 50 its arcuate shape retains it in horizontal position, and accordingly a guide such as was provided in the first embodiment is not necessary.

While I have shown the particular embodiments of my invention, it will be understood of course that I do ont wish to be limited thereto since many modifications may be made, and I therefore contemplate by the claim appended hereto to cover any such modifications or substitutions of equivalents as fall within the true spirit and scope of my invention.

I claim:

An indicator mechanism, comprising, a supporting member, a dial on the supporting member, a rotatable member mounted on the supporting member adjacent one end of the dial, an enclosing member secured to the supporting member in surrounding relation to the periphery of said rotatable member forming an annular space therein, a wire guide secured to said supporting member, said wire guide lying on a line adjacent to and parallel with said dial and having one end adjacent said enclosing member, a pointer slidable on said wire guide, said enclosing member having a tangential opening directed on a line between said wire guide and said dial and parallel therewith, a normally straight flexible member having one end secured to said rotatable member and adapted to coil around the periphery of said rotatable member in said annular space, said flexible member having sufficient rigidity to resume its normal shape in the absence of applied pressure and tending to uncoil from said rotatable member, the cross-sectional dimension of said flexible member being substantially equal to the radial dimension of said annular space, said flexible member adapted to be extended and retracted through said opening on rotation of said rotatable member, the portion of said enclosing member defining said opening guiding said flexible member in a straight line along and adjacent to said dial, the extended end of said flexible member being secured to said pointer, said flexible member, on extension and retraction through said opening, being adapted to slide said pointer along said wire guide and move it along said dial.

ADRIAN PAUL BRIETZKE.

REFERENCES CITED

The following references are of record in the file of this patent:

UNITED STATES PATENTS

| Number | Name | Date |
|---|---|---|
| 1,988,428 | Carlson | Jan. 15, 1935 |
| 2,232,057 | Faller et al. | Feb. 18, 1941 |

FOREIGN PATENTS

| Number | Country | Date |
|---|---|---|
| 432,021 | Great Britain | July 15, 1935 |
| 451,146 | Great Britain | July 30, 1936 |
| 850,001 | France | Dec. 6, 1939 |